(No Model.)
W. J. HULL.
SUPPOSITORY MACHINE.
No. 401,838. Patented Apr. 23, 1889.
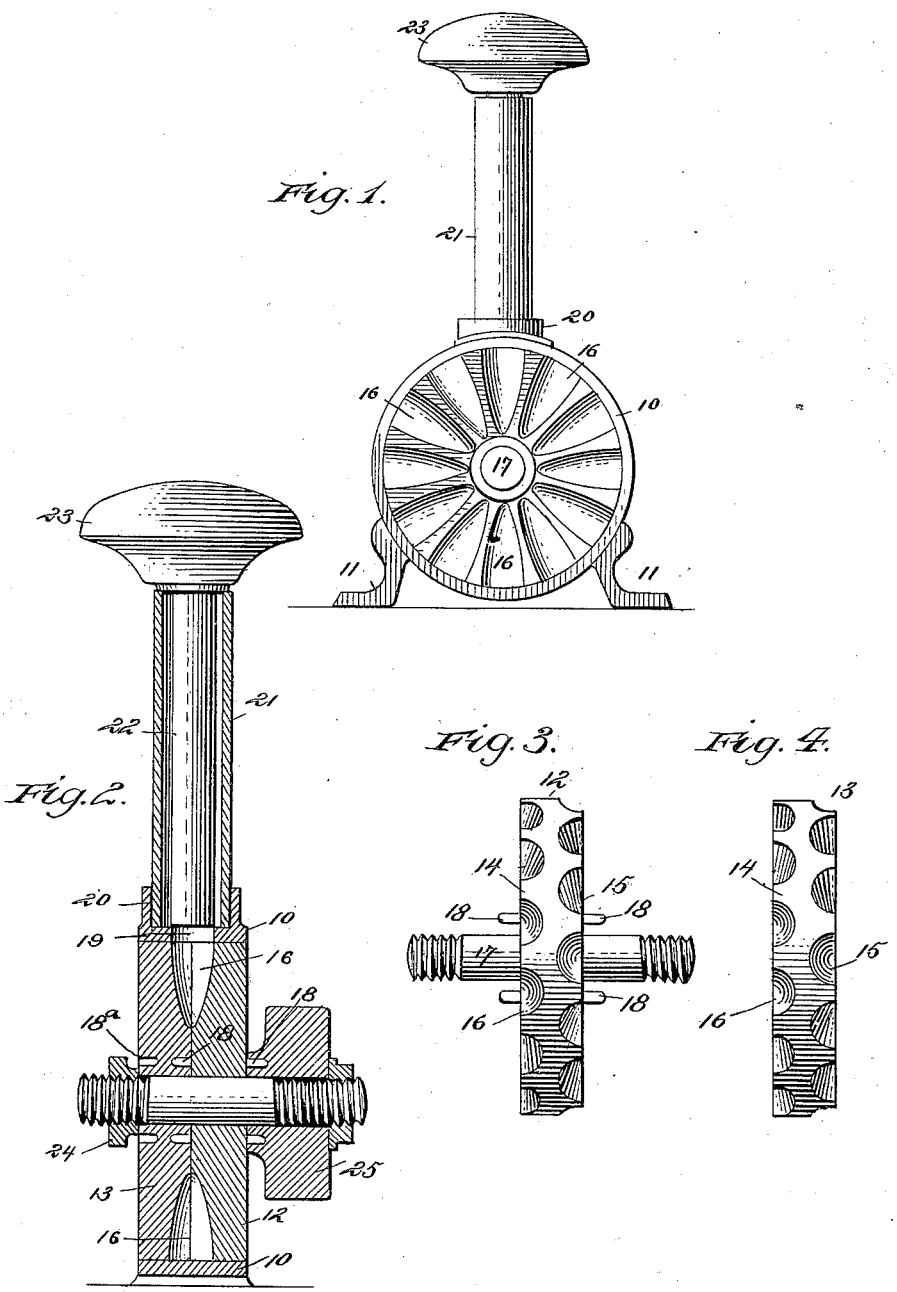
WITNESSES:
W. R. Davis
C. Sedgwick
INVENTOR:
W. J. Hull
BY Munn & Co.
ATTORNEYS.

UNITED STATES PATENT OFFICE.

WAYNE J. HULL, OF ALEXANDRIA, DAKOTA TERRITORY.

SUPPOSITORY-MACHINE.

SPECIFICATION forming part of Letters Patent No. 401,838, dated April 23, 1889.

Application filed September 27, 1888. Serial No. 286,550. (No model.)

*To all whom it may concern:*

Be it known that I, WAYNE J. HULL, of Alexandria, in the county of Hanson and Territory of Dakota, have invented a new and Improved Suppository-Machine, of which the following is a full, clear, and exact description.

My invention relates to an improved machine for forming suppositories, and has for its object to provide a machine of simple, durable, and economical construction, wherein suppositories may be expeditiously formed without the aid of heat; and the further object of the invention is to provide a machine in which suppositories of different sizes may be shaped, and wherein the machine may be manipulated in hot or cold weather.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a side elevation of the machine. Fig. 2 is a central vertical section, and Figs. 3 and 4 are detail views of the molds.

In carrying out the invention the frame consists of a circular casting or ring, 10, provided with attached feet or braces 11, one at each side at or near the bottom, whereby the frame is supported in a perpendicular position.

The mold adapted to revolve in said frame is divided into two sections, 12 and 13, each consisting of a disk, 14, having produced alternately in opposite sides a series of semi-conical recesses, 15 and 16, extending from its periphery diametrically in direction of its center. The semi-conical recesses 15 upon one side of the disks are of greater diameter than the recesses upon the opposite side, and the recesses in corresponding sides of the disk are of equal size, as illustrated in Figs. 3 and 4.

The disk-section 12 is provided with a central fixed spindle or trunnion, 17, projecting from each side, the extremity of which is threaded, and above and below the spindle or trunnion upon each side of the said disk-section 12 a horizontal pin, 18, is cast or otherwise formed, adapted to fit into corresponding apertures 18ᵃ in the disk-section 13, as shown in Fig. 2.

In the upper end of the ring or frame 10, an opening, 19, is produced, surrounded by a flange or collar, 20, a distance therefrom, which collar may be plain or interiorly threaded, as desired.

In the collar 20, near one end, a perpendicular tube, 21, is snugly but removably secured, and in said tube a plunger, 22, is loosely introduced, provided at its outer end with a preferably solid head, 23.

The disk-section 13 is entered upon the spindle 17, so that the large or small semi-conical recesses, as may be desired, will register with the same-sized recesses in the disk-section 12. When this is accomplished, a series of conical molds is formed and the united disks are introduced into the frame, being held to revolve therein by frictional contact, although other means may be employed without departing from the spirit of the invention.

The molds having been placed in position, they are retained in contact by a thumb-nut, 24, screwed upon one end of the spindle 17, and a knob or crank detachably secured upon the opposite end.

In the operation of the machine the medicating ingredients are thoroughly incorporated with cocoa butter or its equivalent in a mortar, and the plunger-tube is filled therewith from the mortar in the same manner as gelatine capsules are filled. The mass is then forced down by the plunger into the respective conical recesses as the disks are revolved, the surplus being cut off by contact with the frame. When all the molds have been filled, the disks are removed and placed upon ice or in cold water until the box and label are ready.

Having thus described my invention, what I claim as new, and desire to secure by Letters Patent, is—

1. The combination, with a tube and a plunger, of a rotary circular mold journaled at the inner end of the tube and having peripheral recesses to successively register with the inner end of the tube, substantially as set forth.

2. In a machine of the character described, the sectional peripherally-recessed mold formed of disks held face to face and each having a circular series of registering recesses in their adjacent faces forming said mold-recesses, and means for holding the disks together, substantially as set forth.

3. In a machine of the character described, a rotary peripherally-recessed mold formed of interchangeable disks held face to face and each having a circular series of recesses in the outer edge of both sides, the recesses on one side or face being of a different size from those on the opposite side, and the like recesses of each disk being similarly spaced to register, and means for holding the disks together with either set of recesses in register, substantially as set forth.

4. The combination, with a ring, a tube communicating with the interior thereof, and a plunger in the tube, of a circular rotary mold fitting in the said ring and having a series of peripheral recesses to successively register with the tube, substantially as set forth.

5. In a machine of the character described, the sectional peripherally-grooved mold consisting of the disk 12, having a central spindle, 17, projecting at both sides and threaded at its ends, pins 18, projecting from both faces of the disk, a second centrally-apertured disk, 13, having apertures in both faces to register with said pins, a knob or its stated equivalent, 25, on one end of the spindle and having apertures to receive the adjacent pins 18, a nut holding the said knob in position, and a nut on the opposite end of the spindle binding the two disks together, the said disks having a series of alternating semicircular recesses in opposite sides thereof.

6. The combination, with a frame, a tube attached thereto, and a plunger loosely held in said tube, of disks capable of side contact and rotation in the frame, said disks having pins and pin-apertures and being provided with a series of grouped semi-conical recesses produced in opposite sides of their periphery and extending toward their center, and means, substantially as described, for rotating the disks, as and for the purpose specified.

7. The combination, with a frame, a tube attached thereto, and a plunger loosely held in said tube, of disks capable of face-contact with each other and rotation in the frame, said disks being provided with a series of semi-conical recesses produced in opposite sides of their periphery and extending toward their center, pins formed upon the face of one disk adapted to enter apertures in the face of the other disk, a spindle passing through the disks provided with a detachable lock-nut at one end and a handle at the other end, all combined to operate substantially as shown and described.

8. The combination, with a frame, a tube attached thereto, and a plunger loosely held in said tube, of interchangeable disk-sections capable of rotating in the frame and provided with a series of semi-conical recesses produced alternately on opposite sides thereof, and means, substantially as shown and described, for securing the disks in contact and rotating the same, substantially as shown and described.

WAYNE J. HULL.

Witnesses:
W. D. KNAPP,
C. W. McCRONE.